US010815371B2

(12) United States Patent
Hirooka et al.

(10) Patent No.: US 10,815,371 B2
(45) Date of Patent: Oct. 27, 2020

(54) POLYACETAL RESIN COMPOSITION AND MOLDED PRODUCT THEREOF

(71) Applicant: MITSUBISHI GAS CHEMICAL COMPANY, INC., Tokyo (JP)

(72) Inventors: Masato Hirooka, Mie (JP); Daisuke Sunaga, Mie (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 143 days.

(21) Appl. No.: 16/087,901

(22) PCT Filed: Mar. 28, 2017

(86) PCT No.: PCT/JP2017/012577
§ 371 (c)(1),
(2) Date: Sep. 24, 2018

(87) PCT Pub. No.: WO2017/170508
PCT Pub. Date: Oct. 5, 2017

(65) Prior Publication Data
US 2019/0106565 A1 Apr. 11, 2019

(30) Foreign Application Priority Data

Mar. 30, 2016 (JP) .................. 2016-067157
Oct. 31, 2016 (JP) .................. 2016-212651

(51) Int. Cl.
C08L 59/02 (2006.01)
C08L 27/18 (2006.01)
C08L 23/00 (2006.01)
C08L 59/00 (2006.01)
C08L 23/08 (2006.01)
C08L 5/00 (2006.01)
B29C 33/62 (2006.01)
C08K 5/01 (2006.01)
C08K 5/12 (2006.01)
C08K 5/13 (2006.01)
B29K 59/00 (2006.01)

(52) U.S. Cl.
CPC .............. C08L 59/02 (2013.01); B29C 33/62 (2013.01); C08K 5/01 (2013.01); C08K 5/12 (2013.01); C08K 5/13 (2013.01); C08L 5/00 (2013.01); C08L 23/00 (2013.01); C08L 23/08 (2013.01); C08L 27/18 (2013.01); C08L 59/00 (2013.01); B29K 2059/00 (2013.01); B29K 2995/0067 (2013.01); B29K 2995/0069 (2013.01)

(58) Field of Classification Search
CPC .......... C08L 59/00; C08L 59/02; C08L 59/04; C08L 91/06; C08L 23/08; C08L 23/04; C08L 23/06; C08L 27/18; C08K 5/01
See application file for complete search history.

(56) References Cited

U.S. PATENT DOCUMENTS

| 5,416,152 A * | 5/1995 | Fleischer ............... C08K 5/098 524/275 |
| 5,559,180 A * | 9/1996 | Takahashi ............... C08L 59/00 524/233 |
| 5,641,571 A * | 6/1997 | Mayer ..................... C08F 14/26 428/402 |
| 6,211,268 B1 | 4/2001 | Matsummura et al. |
| 2006/0025507 A1* | 2/2006 | Moore .................... C08L 59/04 524/275 |
| 2009/0143508 A1 | 6/2009 | Bessho et al. |
| 2009/0298981 A1 | 12/2009 | Nagai et al. |
| 2011/0185527 A1* | 8/2011 | Okamura ................ C08L 59/04 15/207.2 |
| 2012/0251717 A1* | 10/2012 | Zhou ...................... B41M 5/502 427/209 |
| 2015/0166768 A1 | 6/2015 | Shimoda |

FOREIGN PATENT DOCUMENTS

| JP | 2000-7884 | 1/2000 |
| JP | 2005-187728 | 7/2005 |
| JP | 2008-19430 | 1/2008 |
| JP | 2008-214490 | 9/2008 |
| JP | 2009-132768 | 6/2009 |
| JP | 2010-265438 | 11/2010 |
| JP | 2011-32379 | 2/2011 |
| JP | 2012-162589 | 8/2012 |
| JP | 2012-233129 | 11/2012 |
| JP | 2012-233131 | 11/2012 |
| JP | 2013-112728 | 6/2013 |
| JP | 2014-148626 | 8/2014 |

OTHER PUBLICATIONS

Kunihiko, electronic translation of JP 2012-233129, Nov. 2012.*
Extended European Search Report in EP 17775045.2-1102, dated Nov. 19, 2020.
International Search Report issued in International Application No. PCT/JP2017/012577, dated Jun. 13, 2017.
Written Opinion of the International Searching Authority in respect to International Application No. PCT/JP2017/012577, dated Jun. 13, 2017.

* cited by examiner

Primary Examiner — Jeffrey C Mullis
(74) Attorney, Agent, or Firm — Greenblum & Bernstein, P.L.C.

(57) ABSTRACT

A polyacetal resin composition and a molded product thereof are provided which are excellent in thermal stability, little elution of components of the resin composition upon brought into contact with fuel, and good releasability from the mold at the time of molding, and which is excellent in the points of thermal stability, fuel oil resistance and mold releasability. Provided is a polyacetal resin composition which includes (A) a polyacetal resin and (B) a mold release agent, (B) the mold release agent is a polyolefin-based wax and/or a polytetrafluoroethylene-based wax, and a content of (B) the mold release agent in the polyacetal resin composition is 0.01 part by mass or more and 1.0 part by mass or less based on 100 parts by mass of (A) the polyacetal resin.

10 Claims, 1 Drawing Sheet

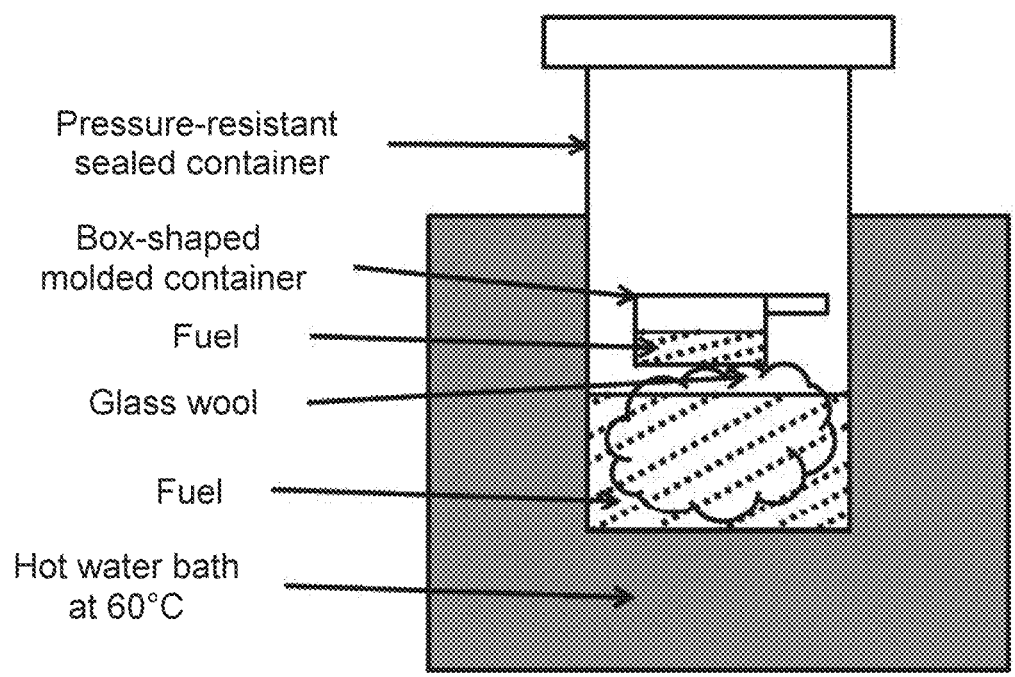

POLYACETAL RESIN COMPOSITION AND MOLDED PRODUCT THEREOF

TECHNICAL FIELD

The present invention relates to a polyacetal resin composition and a molded product thereof.

BACKGROUND ART

The polyacetal resin composition is excellent in a balance of mechanical characteristics, thermal characteristics, electric characteristics, slidability, moldability, etc., and has widely been used for electric devices, automobile parts, precision mechanical parts, etc., as structural materials and mechanical parts, etc. For example, as automobile parts, it has been used for large-sized parts such as a fuel conveying unit represented by a fuel pump module or the like directly brought into contact with fuel (fuel oil). In the polyacetal resin composition used for the parts directly brought into contact the fuel, if elution of the components of the resin composition brought into contact with the fuel is large, it becomes a cause of lowering mechanical strength of the parts.

From such a viewpoint, several polyacetal resin compositions used for parts related to automobile use brought into contact with fuel have been disclosed. For example, Patent document 1 discloses that a molded product of a polyacetal resin composition containing a specific hindered phenol-based antioxidant and a fatty acid calcium salt with specific amounts, respectively, hardly deteriorates even when it is immersed in a high temperature fuel for a long period of time.

In addition, Patent document 2 discloses that a polyacetal resin composition containing a specific hindered phenol-based antioxidant and a fatty acid calcium salt each with a specific amount and a molded product thereof have extremely excellent heat resistance, solvent resistance and acid resistance, and can be applied to parts brought into contact with fuel for automobiles, especially a diesel fuel.

Further, Patent document 3 discloses that a molded product of a polyacetal resin composition containing an antioxidant, a fatty acid metal salt, a nitrogen-containing compound, a nucleating agent and polyethylene glycol or polypropylene glycol each with a specific amount has excellent durability even when it is directly brought into contact with fuel for automobiles.

PRIOR ART DOCUMENTS

Patent Documents

Patent document 1: JP 2013-112728A
Patent document 2: JP 2011-32379A
Patent document 3: JP 2009-132768A

SUMMARY OF THE INVENTION

Problems to be Solved by the Invention

In the polyacetal resin composition used for the parts directly brought into contact with fuel, when components of the eluted resin composition are deposited on the surface of the part, these materials become causes of poor appearance of the part and malfunction of the apparatus using the part. In addition, releasability from a mold when formed into a part directly brought into contact with fuel is also important.

That is, as a polyacetal resin composition used for parts directly brought into contact with fuel, it has been required from the market to obtain a polyacetal resin composition which has not only good thermal stability but also little elution of components of the resin composition upon brought into contact with fuel, favorable in releasability from a mold at the time of molding, and excellent in the points of thermal stability, fuel oil resistance and mold releasability.

From such a viewpoint, the present inventors have investigated about fuel oil resistance and releasability by using calcium stearate which is a fatty acid calcium salt disclosed in the above-mentioned Patent documents 1 to 3 or pentaerythritol tetrastearate which is a fatty acid ester generally used as a mold release agent, and as a result, it has been found that the polyacetal resin compositions using these compounds are poor in thermal stability or elution of components when it is brought into contact with fuel is large, so that these were not satisfactory as a polyacetal resin composition used for parts directly brought into contact with fuel.

That is, an object of the present invention is to provide a polyacetal resin composition and a molded product thereof which are excellent in thermal stability, little elution of components of the resin composition upon brought into contact with fuel, good releasing property from a mold at the time of molding, thermal stability, fuel oil resistance and mold releasability.

Means to Solve the Problems

The present inventors have intensively studied to solve the above-mentioned problems, and as a result, they have found that a polyacetal resin composition comprising a polyacetal resin and a polyolefin-based wax and/or a polytetrafluoro-ethylene-based wax as a mold release agent, and using a specific amount of the mold release agent based on the polyacetal resin is excellent in thermal stability, little elution of component of the resin composition upon brought into contact with fuel and good releasability from a mold at the time of molding, and which is excellent in the points of thermal stability, fuel oil resistance and mold releasability, whereby they have completed the present invention.

That is, the present invention is as follows.

[1] A polyacetal resin composition comprises (A) a polyacetal resin and (B) a mold release agent, wherein (B) the mold release agent is a polyolefin-based wax and/or a polytetrafluoroethylene-based wax, and a content of (B) the mold release agent in the polyacetal resin composition is 0.01 part by mass or more and 1.0 part by mass or less based on 100 parts by mass of (A) the polyacetal resin.

[2] The polyacetal resin composition described in [1], wherein (B) the mold release agent is a polyethylene-based wax and/or a polytetrafluoroethylene-based wax.

[3] The polyacetal resin composition described in [1] or [2], wherein (B) the mold release agent is a polyethylene-based wax, and a viscosity average molecular weight of the polyethylene-based wax is 500 to 15,000.

[4] The polyacetal resin composition described in any one of [1] to [3], wherein a content of (B) the mold release agent in the polyacetal resin composition is 0.04 part by mass or more and 0.15 part by mass or less based on 100 parts by mass of (A) the polyacetal resin.

[5] The polyacetal resin composition described in any one of [1] to [4], wherein the composition further comprises (C) an antioxidant in an amount of 0.01 part by mass or more and 3.0 parts by mass or less based on 100 parts by mass of (A) the polyacetal resin.

[6] The polyacetal resin composition described in [5], wherein (C) the antioxidant is one or more kinds selected from the group consisting of pentaerythritol-tetrakis[3-(3,5-di-tert-butyl-4-hydroxyphenyl)propionate], 1,3,5-trimethyl-2,4,6-tris(3,5-di-tert-butyl-4-hydroxybenzyl)benzene and 3,3',3'',5,5',5''-hexa-tert-butyl-α,α',α''-(mesitylene-2,4,6-triyl)tri-p-cresol.

[7] The polyacetal resin composition described in [5] or [6], wherein a content of (C) the antioxidant in the polyacetal resin composition is 0.03 part by mass or more and 0.15 part by mass or less based on 100 parts by mass of (A) the polyacetal resin.

[8] A molded product obtained by molding the polyacetal resin composition described in any one of [1] to [7].

[9] The polyacetal resin composition described in [1] to [7], which is used for a part brought into contact with fuel.

[10] The molded product described in [8], which is a part brought into contact with fuel.

[11] The molded product described in [10], wherein the fuel is one kind or two or more kinds selected from the group consisting of gasoline fuel, gasohol fuel, diesel fuel and biofuel.

Effects of the Invention

According to the present invention, it is possible to provide a polyacetal resin composition and a molded product thereof which are excellent in thermal stability, little elution of components of the resin composition upon brought into contact with fuel and good releasability from a mold at the time of molding, and which is excellent in the points of thermal stability, fuel oil resistance and mold releasability.

BRIEF DESCRIPTION OF THE DRAWING

The FIGURE shows a schematic drawing of an apparatus used for evaluation of fuel oil resistance in Examples and Comparative examples.

EMBODIMENTS TO CARRY OUT THE INVENTION

In the following, the present invention is explained in detail. The polyacetal resin composition of the present invention comprises (A) a polyacetal resin and (B) a mold release agent, wherein (B) the mold release agent is a polyolefin-based wax and/or a polytetrafluoroethylene-based wax, and a content of (B) the mold release agent in the polyacetal resin composition is 0.01 part by mass or more and 1.0 part by mass or less based on 100 parts by mass of (A) the polyacetal resin. Such a polyacetal resin composition has characteristics that it is excellent in thermal stability, little elution of components of the resin composition upon brought into contact with fuel, and good releasability from a mold at the time of molding, and which is excellent in the points of thermal stability, fuel oil resistance and mold releasability. The reason thereof is not particularly limited, and it can be thought that when the polyacetal resin composition contains a specific amount(s) of the polyolefin-based wax and/or polytetrafluoro-ethylene-based wax, the polyacetal resin composition is excellent in thermal stability and releasability of the polyacetal resin composition from a mold is good, and the polyolefin-based wax and/or the polytetrafluoroethylene-based wax has low solubility in fuel or low reactivity with fuel as mentioned below.

The polyacetal resin composition of the present invention can be suitably used for parts that brought into contact with fuel. Here, the fuel is not particularly limited, and may be referred to, for example, an aliphatic and/or aromatic hydrocarbon compound which may have a hetero atom(s) in a solid, liquid or gas (vapor) state including gasoline fuel, gasohol fuel, diesel fuel, biofuel, and a solid fuel such as wax, etc.

In the following, the components constituting the polyacetal resin composition of the present invention are explained.

<(A) Polyacetal Resin>

The polyacetal resin composition of the present invention contains (A) a polyacetal resin. The (A) polyacetal resin is a polymer having an acetal bond: —O—CRH— (here, R represents a hydrogen atom or an organic group) as a recurring unit, and generally comprises an oxymethylene group (—OCH$_2$—) where R is a hydrogen atom as a main constitutional unit. The polyacetal resin to be used in the present invention contains a copolymer (block copolymer) or a terpolymer which contains one or more kinds of a recurring constitutional unit other than the above-mentioned oxymethylene group, and further includes not only a linear structure but also a branched or crosslinked structure formed by using a glycidyl ether compound, an epoxy compound, an allyl ether compound, etc., as a comonomer and/or a termonomer. The constitutional unit other than the above-mentioned oxymethylene group may be mentioned, for example, an oxyalkylene group which may be branched having 2 or more and 10 or less carbon atoms such as an oxyethylene group (—OCH$_2$CH$_2$— or —OCH(CH$_3$)—), an oxypropylene group (—OCH$_2$CH$_2$CH$_2$—, —OCH(CH$_3$)CH$_2$— or —OCH$_2$CH(CH$_3$)—), an oxybutylene group (—OCH$_2$CH$_2$CH$_2$CH$_2$—, —OCH(CH$_3$)CH$_2$CH$_2$—, —OCH$_2$CH(CH$_3$)CH$_2$—, —OCH$_2$CH$_2$CH(CH$_3$)—, —OCH(C$_2$H$_5$)CH$_2$— or —OCH$_2$CH(C$_2$H$_5$)—), etc., among these, preferably an oxyalkylene group which may be branched and having 2 or more and 4 or less carbon atoms, and particularly preferably an oxyethylene group (—OCH$_2$CH$_2$—). In addition, the content of the constitutional unit (an oxyalkylene group) other than the oxymethylene group in (A) the polyacetal resin is preferably 0.1% by mass or more and 20% by mass or less, more preferably 0.5% by mass or more and 15% by mass or less, and further preferably 0.5% by mass or more and 6.0% by mass or less.

The method for producing (A) the polyacetal resin is not particularly limited, and it may be produced by any conventionally known method. For example, as a method for producing (A) the polyacetal resin having an oxymethylene group and an oxyalkylene group having 2 to 4 carbon atoms as a constitutional unit, it can be produced by copolymerizing a cyclic acetal of an oxymethylene group such as a trimer (trioxane) or a tetramer (tetraoxane) of formaldehyde, etc., and a cyclic acetal containing an oxyalkylene group having 2 or more and 5 or less carbon atoms such as ethylene oxide, 1,3-dioxolane, 1,3,6-trioxocane, 1,3-dioxepane, etc. Among these, (A) the polyacetal resin that can be used in the present invention is preferably a copolymer of a cyclic acetal such as trioxane, tetraoxane, etc., and ethylene oxide or 1,3-dioxolane, particularly preferably a copolymer of trioxane and 1,3-dioxolane.

The (A) polyacetal resin can be obtained, for example, by a method of bulk polymerization of a cyclic acetal of an oxymethylene group and a cyclic acetal containing an oxyalkylene group having 2 or more and 5 or less carbon atoms which is a comonomer using a polymerization catalyst. For deactivation treatment of the polymerization catalyst and the polymerization growth terminal, a reaction terminator may be used, if necessary. In addition, a molecular weight controller may be used as required for controlling the molecular weight of (A) the polyacetal resin. The kind and amount of the polymerization catalyst, the reaction terminator and the molecular weight controller that can be used for producing (A) the polyacetal resin of the present invention are not particularly limited as long as they do not inhibit the effect of the present invention, and any conventionally known optional polymerization catalyst, reaction terminator and molecular weight controller may be appropriately used.

The polymerization catalyst is not particularly limited and it may be mentioned, for example, a Lewis acid such as boron trifluoride, tin tetrachloride, titanium tetrachloride, phosphorus pentachloride, phosphorus pentafluoride, arsenic pentafluoride and antimony pentafluoride, etc., and a complex compound or a salt compound of these Lewis acids. In addition, there may be also mentioned a protonic acid such as trifluoromethanesulfonic acid and perchloric acid, etc.; an ester of a protonic acid such as an ester of perchloric acid and a lower aliphatic alcohol, etc.; and an anhydride of a protonic acid such as a mixed anhydride of perchloric acid and a lower aliphatic carboxylic acid, etc. Other than the above, there may be mentioned triethyloxonium hexafluorophosphate, triphenylmethyl hexafluoroarsenate, acetyl hexafluoroborate, a heteropoly acid or an acid salt thereof, an isopolyacid or an acid salt thereof, a perfluoroalkylsulfonic acid or an acid salt thereof. Among these, a compound containing boron trifluoride is preferable, and boron trifluoride diethyl etherate and boron trifluoride dibutyl etherate, which are coordination complexes with an ether, are particularly preferable.

The amount of the polymerization catalyst to be used is not particularly limited, and is usually $1.0\times10^{-8}$ to $2.0\times10^{-3}$ mol, preferably $5.0\times10^{-8}$ to $8.0\times10^{-4}$ mol, particularly preferably in the range of $5.0\times10^{-8}$ to $1.0\times10^{-4}$ mol based on 1 mol of the total monomers in sum of trioxane and comonomer(s).

The reaction terminator is not particularly limited and, for example, there may be mentioned a trivalent organic phosphorus compound, an amine compound or a hydroxide of an alkali metal or alkaline earth metal. These reaction terminators can be used singly or in combination of two or more kinds. Among these, a trivalent organic phosphorus compound, a tertiary amine and a hindered amine are preferable.

An amount of the reaction terminator to be used is not particularly limited as long as it is an amount sufficient to inactivate the polymerization catalyst, and it is usually in the range of $1.0\times10^{-1}$ to $1.0\times10^{1}$ as a molar ratio based on the polymerization catalyst.

The molecular weight controller is not particularly limited and may be mentioned, for example, methylal, methoxymethylal, dimethoxymethylal, trimethoxymethylal, oxymethylene di-n-butyl ether, etc. Among these, methylal is preferable. An amount of these molecular weight controllers to be used is appropriately determined according to the targeted molecular weight. In general, an addition amount is adjusted in the range of 0 to 0.1% by mass based on the total monomers.

<(B) Mold Release Agent>

It is essential that the polyacetal resin composition of the present invention contains (B) a mold release agent, and a polyolefin-based wax and/or a polytetra-fluoroethylene-based wax is used as (B) the mold release agent. This is because the polyacetal resin composition contains a polyolefin-based wax and/or a polytetra-fluoroethylene-based wax as (B) the mold release agent, so that elution of components of the resin composition upon brought into contact with fuel is little, releasability from a mold at the time of molding is good, and the balance between fuel oil resistance and mold releasability is excellent. In addition, the polyacetal resin composition to which the polyolefin-based wax or the polytetrafluoroethylene-based wax is added has a characteristic that it is excellent in thermal stability than that of a resin composition to which a fatty acid calcium salt (for example, calcium stearate) or a fatty acid ester (for example, pentaerythritol tetrastearate) to be generally used as a mold release agent is added. The polyolefin-based wax or the polytetrafluoroethylene-based wax may be used one kind alone, or two or more kinds in combination. Among these, a polyethylene-based wax and/or a polytetrafluoroethylene-based wax, which will be mentioned later, is preferable as (B) the mold release agent.

The polyolefin-based wax is not particularly limited as long as it is chemically synthesized low molecular weight polymer (synthetic wax) having a skeleton derived from an olefin and may be mentioned, for example, a polyethylene-based wax, a polypropylene-based wax, an ethylene-acrylic acid copolymer wax, an ethylene-vinyl acetate copolymer wax, etc. Also, it may be a material to which a polar group is introduced by subjecting to oxidation modification or acid modification of these waxes. The polyolefin-based wax may be used one kind alone, or two or more kinds in which a kind or viscosity is different from each other in combination.

A molecular weight of the polyolefin-based wax is not particularly limited, and it is preferably 500 to 30,000, more preferably 500 to 15,000, further preferably 1,000 to 10,000, and particularly preferably 2,000 to 8,000 in terms of a viscosity average molecular weight. If the viscosity average molecular weight of the polyolefin-based wax is 500 or more, elution of the mold release agent when it is brought into contact with the fuel tends to be suppressed. On the other hand, if the viscosity average molecular weight is 30,000 or less, releasability at the time of molding tends to be favorable by adding a small amount of the mold release agent.

As (B) the mold release agent, among the above-mentioned polyolefin-based waxes, it is preferable to be the polyethylene-based wax and/or the polypropylene-based wax, and particularly preferably the polyethylene-based wax.

The polyethylene-based wax is not particularly limited as long as it is a low molecular weight polymer having a skeleton derived from ethylene and may be mentioned, for example, a low molecular weight polyethylene polymer (hereinafter simply referred to as a low molecular weight polyethylene) or a low molecular weight polyethylene copolymer, and an oxidation-modified polyethylene wax or an acid-modified polyethylene wax to which a polar group is introduced by subjecting to oxidation modification or acid modification thereof. These low molecular weight polyethylene, low molecular weight polyethylene copolymer, oxidation-modified polyethylene wax and acid-modified polyethylene wax may be used one kind alone or two or more kinds in combination.

The low molecular weight polyethylene is a low molecular weight polymer obtained by polymerizing ethylene, and its structure may be linear (high density polyethylene) or branched (low density polyethylene).

The low molecular weight polyethylene copolymer is a low molecular weight copolymer obtained by polymerizing ethylene and an α-olefin, and its structure may be linear (high density polyethylene) or branched (low density polyethylene). The low molecular weight polyethylene copolymer is preferably a low molecular weight polyethylene copolymer in which the α-olefin is propylene.

A composition ratio of ethylene and an α-olefin in the low molecular weight polyethylene copolymer is not particularly limited, and it is preferable that the ethylene content is 50 mol % or more and less than 100 mol % and the α-olefin content is more than 0 mol % and 50 mol % or less based on the total molar content of ethylene and α-olefin in the low molecular weight polyethylene copolymer. When the α-olefin is propylene, it is preferable that the ethylene content is 50 mol % or more and less than 100 mol % and the propylene content is more than 0 mol % and 50 mol % or less based on the total molar content of ethylene and propylene in the low molecular weight polyethylene copolymer.

The method for producing the low molecular weight polyethylene or the low molecular weight polyethylene copolymer is not particularly limited, and it may be produced by, for example, a method of directly polymerizing ethylene or ethylene and an α-olefin with a Ziegler catalyst, etc., a method of obtaining as a by-product at the time of producing a high molecular weight polyethylene or a copolymer, a method of thermally decomposing a high molecular weight polyethylene or a copolymer, or the like.

The oxidation-modified polyethylene wax is not particularly limited as long as it is a product obtained by treating the above-mentioned low molecular weight polyethylene polymer or low molecular weight polyethylene copolymer with a peroxide, oxygen or the like to introduce a polar group such as a carboxyl group, a hydroxyl group, etc.

The acid-modified polyethylene wax is not particularly limited as long as it is a material to which a polar group such as a carboxyl group, a sulfonic acid group, etc., is introduced to the above-mentioned low molecular weight polyethylene polymer or low molecular weight polyethylene copolymer by treating with inorganic acid, an organic acid, an unsaturated carboxylic acid, etc., if necessary, in the presence of a peroxide or oxygen.

A viscosity average molecular weight of the polyethylene-based wax is not particularly limited, and preferably 500 to 15,000, more preferably 1,000 to 10,000, and particularly preferably 2,000 to 8,000. If the viscosity average molecular weight of the polyethylene-based wax is 500 or more, elution of the mold release agent when it is brought into contact with the fuel tends to be suppressed. On the other hand, if the viscosity average molecular weight is 15,000 or less, releasability at the time of molding tends to be favorable by adding a small amount of the mold release agent.

The above-mentioned polyethylene-based wax may be used a single kind alone, or two or more kinds in which a kind or viscosity is different from each other in combination.

The above-mentioned polyethylene-based wax may be a commercially available product and a material that is commercially sold under the name of, for example, general polymerization type high density type polyethylene wax, general polymerization type low density type polyethylene wax, oxidation type polyethylene wax (small acid value), oxidation type polyethylene wax (high acid value), acid-modified type polyethylene wax, specific monomer-modified type polyethylene wax, or low density polyethylene general type polyethylene wax, etc., may be used. For example, as the oxidation type polyethylene wax, Hi-WAX 220MP available from Mitsui Chemicals, Inc., can be used. Also, as the high density type polyethylene wax, Hi-WAX 800P available from Mitsui Chemicals, Inc., can be used.

The polytetrafluoroethylene-based wax is not particularly limited as long as it is a polymer having a tetrafluoroethylene skeleton and may be mentioned, for example, polytetrafluoroethylene (PTFE), and a copolymer of a tetrafluoroethylene and other monomer(s). Among these, polytetrafluoroethylene is preferable, and low molecular weight polytetrafluoroethylene is particularly preferable.

The low molecular weight polytetrafluoroethylene is not particularly limited and may be mentioned, for example, powder state polytetrafluoroethylene (PTFE powder), fibrous polytetrafluoroethylene (PTFE fiber) and aqueous dispersion liquid state polytetrafluoroethylene (PTFE dispersion), and PTFE powder is particularly preferable from the viewpoint of dispersibility.

As the low molecular weight polytetrafluoroethylene, commercially available products may be used and may be mentioned, for example, Lubron L5 (Registered Trademark) available from Daikin Industries, Ltd., as the PTFE powder.

A content of (B) the mold release agent in the polyacetal resin composition of the present invention is 0.01 part by mass or more and 1.0 part by mass or less based on 100 parts by mass of (A) the polyacetal resin. If the content of (B) the mold release agent in the polyacetal resin composition is 0.01 part by mass or more, releasability of the molded product from a mold tends to be favorable. On the other hand, if the content thereof is 1.0 part by mass or less, thermal stability and fuel oil resistance tend to be excellent.

The content of (B) the mold release agent in the polyacetal resin composition is preferably 0.02 part by mass or more and 0.7 part by mass or less, more preferably 0.03 part by mass or more and 0.2 part by mass or less, further preferably 0.04 part by mass or more and 0.15 part by mass or less, and particularly preferably 0.08 part by mass or more and 0.12 part by mass or less based on 100 parts by mass of (A) the polyacetal resin. If the content of (B) the mold release agent is 0.03 part by mass or more and 0.2 part by mass or less, the resin composition and the molded product are excellent in the points of thermal stability, fuel oil resistance and mold releasability, if it is 0.04 part by mass or more and 0.15 part by mass or less, these are more excellent in the points of thermal stability, fuel oil resistance and mold releasability, and if it is 0.08 part by mass or more and 0.12 part by mass or less, these are particularly excellent in the points of thermal stability, fuel oil resistance and mold releasability.

<(C) Antioxidant>

The polyacetal resin composition of the present invention preferably further comprises (C) an antioxidant. When the polyacetal resin composition contains (C) the antioxidant, heat resistance of the resin composition is improved, so that the thermal stability at the time of molding process tends to be excellent, and as a result, a molded product favorable in mechanical strength and fuel oil resistance tends to be obtained.

A kind of (C) the antioxidant is not particularly limited and may be mentioned, for example, ethylenebis(oxyethylene)bis[3-(5-tert-butyl-4-hydroxy-m-tolyl)propionate] (for example, BASF, IRGANOX (Registered Trademark) 245), N,N'-hexan-1,6-diylbis[3-(3,5-di-tert-butyl-4-hydroxyphenylpropionamide] (for example, BASF, IRGANOX (Registered Trademark) 1098), pentaerythritoltetrakis[3-(3,5-di-tert-butyl-4-hydroxyphenyl)propionate] (for example, BASF, IRGANOX (Registered Trademark) 1010), 1,3,5-trimethyl-2,4,6-tris(3,5-di-tert-butyl-4-hydroxybenzyl)benzene (for example, Rianlon, THANOX (Registered Trademark) 330), 3,3',3",5,5',5"-hexa-tert-butyl-α,α',α"-(mesitylene-2,4,6-triyl)tri-p-cresol (for example, BASF, IRGANOX (Registered Trademark) 1330) and 1,3,5-tris(3,5-di-tert-butyl-4- hydroxybenzyl)-1,3,5-triazin-2,4,6(1H,3H,5H)-trion (for example, BASF, IRGANOX (Registered Trademark) 3114).

Among these, it is more preferable that (C) the antioxidant is one or more kinds selected from the group consisting of pentaerythritol-tetrakis[3-(3,5-di-tert-butyl-4-hydroxyphenyl)propionate] (for example, BASF, IRGANOX (Registered Trademark) 1010), 1,3,5-trimethyl-2,4,6-tris(3,5-di-tert-butyl-4-hydroxybenzyl)benzene (for example, Rianlon, THANOX (Registered Trademark) 330), and 3,3',3",5,5',5"-hexa-tert-butyl-α,α',α"-(mesitylene-2,4,6-triyl)tri-p-cresol (for example, BASF, IRGANOX (Registered Trademark) 1330), since elution of (C) the antioxidant from the resin composition and the molded product difficultly occurs and fuel oil resistance is excellent while maintaining thermal stability of the resin composition and the molded product by (C) the antioxidant. Further, it is particularly preferable that (C) the antioxidant is 1,3,5-trimethyl-2,4,6-tris(3,5-di-tert-butyl-4-hydroxybenzyl)benzene (for example, Rianlon, THANOX (Registered Trademark) 330) and/or 3,3',3",5,5',5"-hexa-tert-butyl-α,α',α"-(mesitylene-2,4,6-triyl)tri-p-cresol (for example, BASF, IRGANOX (Registered Trademark) 1330) since the resin composition and the molded product are particularly excellent in thermal stability and fuel oil resistance.

A content of (C) the antioxidant in the polyacetal resin composition is not particularly limited, and is preferably 0.01 part by mass or more and 3.0 parts by mass or less based on 100 parts by mass of (A) the polyacetal resin. If the content of (C) the antioxidant in the resin composition is 0.01 part by mass or more, heat resistance of the resin composition and the molded product tends to be improved. On the other hand, if the content is 3.0 parts by mass or less, elution of (C) the antioxidant from the resin composition and the molded product difficultly occurs, fuel oil resistance is excellent, and mold releasability tends to be excellent. In addition, the content of (C) the antioxidant is more preferably 0.01 part by mass or more and 0.5 part by mass or less, further preferably 0.02 part by mass or more and 0.2 part by mass or less, and particularly preferably 0.03 part by mass or more and 0.15 part by mass or less. When the content of (C) the antioxidant is 0.02 part by mass or more and 0.2 part by mass or less, the resin composition and the molded product are excellent in the points of thermal stability, fuel oil resistance and mold releasability, and when it is 0.03 part by mass or more and 0.15 part by mass or less, these are particularly excellent in the points of thermal stability, fuel oil resistance and mold releasability.

In a preferred embodiment of the present invention, by using a polyolefin-based wax and/or a polytetrafluoroethylene-based wax as (B) a mold release agent in combination with (C) an antioxidant, fuel oil resistance is excellent, as well as mold releasability and thermal stability are also excellent.

<Other Optional Ingredients that May be Added>

Further, when practicing the present invention, a nitrogen-containing compound other than (C) the antioxidant, and a metal-containing compound represented by the group consisting of a hydroxide, a carbonate, an inorganic acid salt and an alkoxide of an alkali metal or an alkaline earth metal may further be added within the range which does not impair the objects of the present invention.

The nitrogen-containing compound is not particularly limited and may be mentioned, for example, an amino-substituted triazine compound, a polyamide resin and a hindered amine compound.

An amount of the nitrogen-containing compound to be added is not particularly limited, and is preferably 0.01 to 5.0 parts by mass, more preferably 0.01 to 3.0 parts by mass, and particularly preferably 0.02 to 2.0 parts by mass based on 100 parts by mass of (A) the polyacetal resin. If the amount of the nitrogen-containing compound to be added is 0.01 part by mass or more, thermal stability of the polyacetal resin composition is improved, while if the amount thereof to be added is 5.0 parts by mass or less, thermal stability of the polyacetal resin composition can be improved without accompanying marked lowering in tensile elongation and impact resistance.

The amino-substituted triazine compound is not particularly limited and may be mentioned, for example, methylol melamine such as guanamine, melamine, N-butylmelamine, N-phenylmelamine, N,N-diphenylmelamine, N,N-diallylmelamine, N,N',N"-triphenylmelamine, N,N',N"-trimethylol melamine, etc., an alkylated melamine such as hexamethoxymethylmelamine, etc., benzoguanamine, 2,4-diamino-6-methyl-sym-triazine, 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, ammeline (N,N,N',N'-tetracyanoethylbenzo-guanamine), a water-soluble melamine-formaldehyde resin, etc. Among these, melamine, methylol melamine, alkylated melamine, benzoguanamine, and a water-soluble melamine-formaldehyde resin are preferable. The above-mentioned amino-substituted triazine compound may be used alone, or two or more kinds thereof may be used in combination. These amino-substituted triazine compounds are used as a heat-resistant stabilizer.

The polyamide resin is not particularly limited as long as it is a resin having two or more amide bonds in the molecule and may be mentioned, for example, Nylon 6, Nylon 6,6, Nylon 6,10, a ternary copolymer thereof, a polymerized fatty acid-based polyamide resin and a polyamide elastomer, etc. Among these, a polymerized fatty acid-based polyamide resin or a polyamide elastomer are particularly preferable. These polyamide resins may be used one kind alone, or two or more kinds thereof in combination.

Here, the polymerized fatty acid-based polyamide resin refers to a polyamide resin composed of a polycondensate of a polymerized fatty acid and a diamine.

The polymerized fatty acid is a polymer of an unsaturated fatty acid, or a material obtained by hydrogenating the polymer, and the polymerized fatty acid may be mentioned, for example, a dimer (dimer acid) of a monobasic fatty acid having 10 to 24 carbon atoms and having one or more double bond or triple bond or hydrogenated product thereof. The dimer acid may be mentioned, for example, dimers of such as oleic acid, linoleic acid and erucic acid, etc.

Examples of the diamine may be mentioned hexamethylenediamine, heptamethylenediamine, octamethylenediamine, decamethylenediamine and m-xylylenediamine, etc.

The polyamide elastomer refers to a polyamide resin having a hard segment and a soft segment, the hard segment comprising polyamide, and the soft segment comprising a polymer other than the polyamide. The polyamide constituting the hard segment may be mentioned, for example, Nylon 6, Nylon 6,6, Nylon 6,10, a ternary copolymer thereof, a polymerized fatty acid-based polyamide resin, etc. The polymer other than the polyamide may be mentioned, for example, an aliphatic polyester and an aliphatic polyether. The aliphatic polyester may be mentioned, for example, poly(ε-caprolactone), polyethylene adipate, polybutylene adipate and polybutylene succinate, etc. The aliphatic polyether may be mentioned, for example, polyoxyalkylene glycol such as polyethylene oxide, polypropylene oxide, etc.

The hindered amine compound is not particularly limited and may be mentioned, for example, N,N',N'',N'''-tetrakis-(4,6-bis-(butyl-(N-methyl-2,2,6,6-tetramethylpiperidin-4-yl)amino)-triazin-2-yl)-4,7-diazadecane-1,10-diamine, a polycondensate of dibutylamine 1,3,5-triazine N,N'-bis(2,2,6,6-tetramethyl-4-piperidyl-1,6-hexamethylenediamine and N-(2,2,6,6-tetramethyl-4-piperidyl)butylamine (BASF, Chimassorb (Registered Trademark) 2020 FDL), poly[{6-(1,1,3,3-tetramethyl-butyl)amino-1,3,5-triazin-2,4-diyl}{(2,2,6,6-tetramethyl-4-piperidyl}imino)hexa-methylene{(2,2,6,6-tetramethyl-4-piperidyl)imino}], a polycondensate of dimethyl succinate and 4-hydroxy-2,2,6,6-tetramethyl-1-piperidineethanol (BASF, Tinuvin (Registered Trademark) 622 SF), bis(1,2,2,6,6-pentamethyl-4-piperidyl)[[3,5-bis(1,1-dimethylethyl)-4-hydroxyphenyl]methyl]butylmalonate, bis(2,2,6,6-tetramethyl-4-piperidyl)sebacate, bis(1,2,2,6,6-pentamethyl-4-piperidyl)sebacate, and 1-[2-[3-(3,5-di-t-butyl-4-hydroxyphenyl)propionyloxy]ethyl]-4-[3-(3,5-di-t-butyl-4-hydroxyphenyl)propionyloxy]-2,2,6,6-tetramethylpiperidine. Among these, bis(2,2,6,6-tetramethyl-4-piperidyl)sebacate, bis(1,2,2,6,6-pentamethyl-4-piperidyl)-sebacate and a polycondensate of dimethyl succinate and 4-hydroxy-2,2,6,6-tetramethyl-1-piperidineethanol (BASF, Tinuvin (Registered Trademark) 622 SF) are preferable. The above-mentioned hindered amine compound may be used one kind alone or two or more kinds in combination. These hindered amine compounds are used as a light stabilizer and an antioxidant.

As the inorganic acid salt in the metal-containing compound represented by the group consisting of a hydroxide, a carbonate, an inorganic acid salt and an alkoxide of an alkali metal or an alkaline earth metal, there may be mentioned a phosphate, a silicate, a borate, etc., and the alkoxide may be mentioned methoxide, ethoxide, etc. Among these, preferred are a hydroxide, a carbonate, an inorganic acid salt or an alkoxide of an alkaline earth metal, and more preferred are calcium hydroxide, magnesium hydroxide, calcium carbonate, or magnesium carbonate.

An amount of the metal-containing compound represented by the group consisting of a hydroxide, a carbonate, an inorganic acid salt and an alkoxide of an alkali metal or an alkaline earth metal to be added is not particularly limited, and is preferably 0.001 to 5.0 parts by mass, particularly preferably 0.01 to 3.0 parts by mass based on 100 parts by mass of (A) the polyacetal resin.

Also, when the present invention is practiced, various kinds of light stabilizers, ultraviolet absorbers, lubricants other than (B) the mold release agent, nucleating agents, fillers, pigments, surfactants, antistatic s, etc., may be further added within the range which do not impair the object of the present invention.

<Method for Producing Polyacetal Resin Composition>

The method for producing the polyacetal resin composition of the present invention is not particularly limited as long as it is a method in which the above-mentioned (A) polyacetal resin and the polyolefin-based wax and/or the polytetrafluoroethylene-based wax as (B) the mold release agent are mixed and then subjected to melting and kneading, and a conventionally known method for producing a polyacetal resin composition can be used. For example, it can be produced by mixing the above-mentioned (A) polyacetal resin, the polyolefin-based wax and/or the polytetrafluoroethylene-based wax, and depending on necessity, (C) the antioxidant and the above-mentioned other optional component(s) which may be added with an optional order, and subjected to melting and kneading them.

The conditions of a temperature and a pressure for melting and kneading may be appropriately selected according to a conventionally known method for producing a polyacetal resin composition, and are not particularly limited. For example, the temperature for melting and kneading is preferably the melting temperature of (A) the polyacetal resin or higher and 270° C. or lower, and particularly preferably 190° C. or higher and 250° C. or lower. Also, the pressure at the time of melting and kneading is preferably 6.7 kPa or more and 66.7 kPa or less, and particularly preferably 13.3 kPa or more and 40.0 kPa or less in the absolute pressure. A time (residence time in the apparatus used for melting and kneading) for carrying out the melting and kneading is not particularly limited, and is preferably 1 to 60 minutes, particularly preferably 1 to 40 minutes.

An apparatus used for melting and kneading is also not particularly limited, and a melt-kneading apparatus such as a single-screw or twin-screw extruder, etc., conventionally used for producing this type of resin composition can be used. There is also no particular limitation on the method of melting and kneading and a polyacetal resin composition (pellets) can be obtained, for example, by continuously extrusion molding with devolatilization under the above-mentioned temperature and pressure using the above-mentioned single-screw or twin-screw extruder.

Specifically, for example, a polyolefin-based wax and/or a polytetrafluoro-ethylene-based wax is/are added to (A) the polyacetal resin, and if desired, (C) the antioxidant and/or the above-mentioned other optional component(s) which may be added is/are further added, followed by mixing with a tumbler type blender, etc. Then, the obtained mixture is melted and kneaded by a single-screw or twin-screw extruder, extruded in a strand form, and pelletized, whereby a polyacetal resin composition having a desired composition can be obtained.

As another method, a polyolefin-based wax and/or a polytetrafluoroethylene-based wax is/are added to (A) the polyacetal resin and mixed, and then, melted and kneaded, and pelletized. The (C) antioxidant and/or the above-mentioned other optional component(s) which may be added, etc., is/are further added to the pellets, if desired, and then the mixture is mixed, melted and kneaded again and pelletized to obtain a polyacetal resin composition having a desired composition. In addition, the resin composition melted and kneaded by the extruder can be directly made into injection molded products, blow molded products, extrusion molded products or the like without passing through the pellets.

<Molded Product of Polyacetal Resin Composition and Use Thereof>

The polyacetal resin composition of the present invention can be molded into various forms according to a known molding process of a polyacetal resin. The molded product comprising the polyacetal resin composition of the present invention may be mentioned various shapes such as pellets, round bars, thick plates, sheets, tubes, cylindrical or rectangular containers, and the invention is not limited thereto.

The polyacetal resin composition of the present invention and the molded product thereof can be used as various parts machinery, electricity, automobiles, building materials and others which are conventionally known for use of the polyacetal resin composition, and in particular, they are suitable for use as a part of a fuel tank cap, etc., which is directly brought into contact with a solid, a liquid, a gas (particularly steam) of a fuel to be mentioned later.

The fuel in the present invention is, as mentioned above, not particularly limited, and is a solid, a liquid or a gas (particularly steam) state fuel containing an aliphatic and/or aromatic hydrocarbon compound which may have a hetero atom(s), and may be mentioned, for example, gasoline fuel, gasohol fuel, diesel fuel and biofuel. These fuels may be one kind or may be a mixture of two or more kinds. The gasoline fuel is not particularly limited as long as it is a petroleum product that is generally used as fuel for an automobile, and does not indicate a special fuel. The gasohol fuel is not particularly limited as long as it is a mixture of gasoline and an alcohol such as methanol, ethanol, etc. The diesel fuel is not particularly limited as long as it is a petroleum product used as fuel for a diesel engine and may be mentioned, for example, light oil. The biofuel is not particularly limited as long as it is fuel produced from reproducible organic resources (biomass) derived from organisms as a raw material.

EXAMPLES

In the following, the present invention will be specifically explained with regard to the embodiments and the effects thereof by showing Examples and Comparative examples, but the present invention is not limited by these examples at all.

The polyacetal resin compositions in Examples and Comparative examples were prepared as follows.
<Production of (A) Polyacetal Resin>

To a biaxial continuous polymerization apparatus having a self-cleaning type paddle having a jacket the temperature of which was set at 65° C. were added continuously 100 parts by mass of trioxane, 4 parts by mass of 1,3-dioxolane, boron trifluoride diethyl etherate as a catalyst with such an amount that became 0.05 mmol based on 1 mol of whole monomer (trioxane and 1,3-dioxolane) as a benzene solution, and methylal as a molecular weight controller with such an amount that became 500 ppm based on whole monomer as a benzene solution, and the polymerization reaction was continuously carried out so that the residence time of the raw materials and the polymerization reaction product in the continuous polymerization apparatus became 20 minutes.

To the obtained polymerization reaction product was added triphenylphosphine with such an amount that became 2 mol based on 1 mol of the used boron trifluoride diethyl etherate as a benzene solution. After inactivating the catalyst, it was pulverized to obtain (A) a polyacetal resin.
<Production of Polyacetal Resin Composition>

The (A) polyacetal resin, (B) the mold release agent and (C) the antioxidant were mixed with the formulation amount (unit: part(s) by mass) shown in Table 1 to Table 3, and melted under heating in the temperature range of 210 to 230° C. in a twin-screw extruder with a bore diameter of 30 mm and devolatilized under reduced pressure of 21.3 kPa to prepare pellets of the polyacetal resin compositions of Examples 1 to 16 and Comparative examples 1 to 4.

The meaning of the symbols described in Examples and Comparative examples in Table 1 to Table 3 are shown as follows.
<B: Mold Release Agent>
B-1: Polyethylene-based wax (Hi-WAX 220MP, available from Mitsui Chemicals, Inc., molecular weight 2,000)
B-2: Polyethylene-based wax (Hi-WAX 800P, available from Mitsui Chemicals, Inc., molecular weight 8,000)
B-3: Polytetrafluoroethylene-based wax (Lubron (Registered Trademark) L5, available from Daikin Industries, Ltd.)
B-4: Pentaerythritol tetrastearate (WE-476, available from NOF CORPORATION)
B-5: Calcium stearate (calcium stearate, available from NOF CORPORATION)
<C: Antioxidant>
C-1: Ethylenebis(oxyethylene)bis[3-(5-tert-butyl-4-hydroxy-m-tolyl)propionate (IRGANOX (Registered Trademark) 245, available from BASF)
C-2: Pentaerythritoltetrakis[3-(3,5-di-tert-butyl-4-hydroxyphenyl)propionate] (IRGANOX (Registered Trademark) 1010, available from BASF)
C-3: 1,3,5-Trimethyl-2,4,6-tris(3,5-di-tert-butyl-4-hydroxybenzyl)benzene (THANOX (Registered Trademark) 330, available from Rianlon)
C-4: N,N'-hexan-1,6-diylbis[3-(3,5-di-tert-butyl-4-hydroxyphenylpropionamide] (IRGANOX (Registered Trademark) 1098, available from BASF)

Respective physical properties of the polyacetal resin composition in Examples and Comparative examples were measured as follows. The evaluation results of the polyacetal resin composition in Examples and Comparative examples are shown in Table 1 to Table 3.
<Evaluation of Mold Releasability>

Evaluation of mold releasability was carried out as follows. A container (box-shaped molded container) molded into a box shape of 30×50×30 mm having a rib at the center was continuously and fully automatically molded using an injection molding machine PS40 manufactured by Nissei Plastic Industrial Co., Ltd., and a pressing pressure applied to the ejector pin when the box-shaped molded container was released was measured using a pin type pressure sensor. An average value of the pressing pressure applied to the ejector pin from the eleventh shot to the thirtieth shot among the 30-shot consecutive moldings was made the mold releasing resistance value of each sample of Examples and Comparative examples.
<Evaluation of Fuel Oil Resistance>

Evaluation of fuel oil resistance was carried out by the following procedure. A schematic drawing of an apparatus used for evaluation of fuel oil resistance was shown in the FIGURE. First, 300 ml of a mixed solution of toluene/isooctane/methanol=42.5/42.5/15.0 vol % was charged in a pressure-resistant sealed container as fuel for evaluation of fuel oil resistance. About 10 g of glass wool was charged in the pressure-resistant sealed container to which the fuel had been charged, and the box-shaped molded container used for the above-mentioned evaluation of releasability was placed on the glass wool so as not to come into direct contact with the fuel. Into the box-shaped molded container was charged 6 ml of the same fuel, and the lid of the pressure-resistant sealed container was closed.

The pressure-resistant sealed container into which the box-shaped molded container had been charged was heated in a hot water bath at 60° C. for 300 hours to expose the box-shaped molded container to the vapor of the fuel. After the lapse of 300 hours, the box-shaped molded container was taken out from the pressure-resistant sealed container, the fuel attached to the box-shaped molded container was air-dried, and then the inner bottom surface of the box-shaped molded container was observed.
<Evaluation of Retention Thermal Stability>

The polyacetal resin compositions of Examples and Comparative examples were each melted and maintained in a cylinder of IS75E-2B manufactured by Toshiba Machine Co., Ltd., heated to 240° C., at intervals of 12 minutes up to 72 minutes at the maximum, and then, a thin plate with a thickness of 3 mm was formed by molding using the polyacetal resin composition, and the time (minute) during which silver streak was observed in the molded thin plate (molded piece) was evaluated by naked eyes. It is practical if the time for observing silver streak is 48 minutes or longer, which means that the longer shows excellent thermal stability.

<Evaluation Standard>

Evaluation standards for evaluation of mold releasability, evaluation of fuel oil resistance and retention thermal stability in Examples and Comparative examples are as follows.

Evaluation of Mold Releasability:

When the average value of pressing pressure applied to the ejector pin (releasing resistance value) is 3.1 MPa or less, it is judged as ⊚ (excellent), when it exceeds 3.1 MPa and 4.1 MPa or less, it is judged as ○ (good), and when it exceeds 4.1 MPa, it is judged as × (poor).

Evaluation of Fuel Oil Resistance:

It was evaluated by a ratio (elution amount) at which the eluted component occupies the inner bottom surface portion of the box-shaped molded container, and evaluated with the numerical values of the following 1 to 5 stages. 1 is the best and 5 is the worst.

1: Almost no elution is observed. 0%≤Elution amount≤5%.

2: Very slight elution is observed. 5%≤Elution amount≤10%.

3: Slight elution is observed. 10%≤Elution amount≤25%.

4: Elution is observed. 25%≤Elution amount≤50%.

5: A large amount of elution is observed. 50%<Elution amount.

TABLE 1

| | | | Example 1 | Example 2 | Example 3 | Example 4 |
|---|---|---|---|---|---|---|
| Formulation amount (parts by mass) | Polyacetal resin (A) | | 100 | 100 | 100 | 100 |
| | Mold release agent (B-1) | Hi-WAX 220MP (PE wax) | 0.15 | | | 0.10 |
| | Mold release agent (B-2) | Hi-WAX 800P (PE wax) | | 0.15 | | |
| | Mold release agent (B-3) | Lubron L5 (Teflon wax) | | | 0.15 | |
| | Mold release agent (B-4) | Pentaerythritol tetrastearate (PETS) | | | | |
| | Mold release agent (B-5) | Calcium stearate (StCa) | | | | |
| | Antioxidant (C-1) | IRGANOX 245 | 0.30 | 0.30 | 0.30 | 0.30 |
| | Antioxidant (C-2) | IRGANOX 1010 | | | | |
| | Antioxidant (C-3) | THANOX 330 | | | | |
| | Antioxidant (C-4) | IRGANOX 1098 | | | | |
| Evaluation of physical property | Evaluation result of mold releasability | | ○ | ○ | ○ | ○ |
| | Evaluation result of fuel oil resistance | | 3 | 3 | 2 | 3 |
| | Retention thermal stability (unit: min) | | 72 | 60 | 60 | 72 |

| | | | Example 5 | Example 6 | Example 7 | Example 8 |
|---|---|---|---|---|---|---|
| Formulation amount (parts by mass) | Polyacetal resin (A) | | 100 | 100 | 100 | 100 |
| | Mold release agent (B-1) | Hi-WAX 220MP (PE wax) | 0.05 | 0.10 | 0.10 | 0.05 |
| | Mold release agent (B-2) | Hi-WAX 800P (PE wax) | | | | |
| | Mold release agent (B-3) | Lubron L5 (Teflon wax) | | | | |
| | Mold release agent (B-4) | Pentaerythritol tetrastearate (PETS) | | | | |
| | Mold release agent (B-5) | Calcium stearate (StCa) | | | | |
| | Antioxidant (C-1) | IRGANOX 245 | 0.30 | 0.20 | 0.05 | 0.05 |
| | Antioxidant (C-2) | IRGANOX 1010 | | | | |
| | Antioxidant (C-3) | THANOX 330 | | | | |
| | Antioxidant (C-4) | IRGANOX 1098 | | | | |
| Evaluation of physical property | Evaluation result of mold releasability | | ○ | ○ | ⊚ | ○ |
| | Evaluation result of fuel oil resistance | | 3 | 3 | 2 | 2 |
| | Retention thermal stability (unit: min) | | 72 | 72 | 48 | 48 |

TABLE 2

| | | | Example 9 | Example 10 | Example 11 | Example 12 |
|---|---|---|---|---|---|---|
| Formulation amount (parts by mass) | Polyacetal resin (A) | | 100 | 100 | 100 | 100 |
| | Mold release agent (B-1) | Hi-WAX 220MP (PE wax) | 0.10 | 0.10 | 0.05 | 0.10 |
| | Mold release agent (B-2) | Hi-WAX 800P (PE wax) | | | | |
| | Mold release agent (B-3) | Lubron L5 (Teflon wax) | | | | |
| | Mold release agent (B-4) | Pentaerythritol tetrastearate (PETS) | | | | |
| | Mold release agent (B-5) | Calcium stearate (StCa) | | | | |
| | Antioxidant (C-1) | IRGANOX 245 | | | | |
| | Antioxidant (C-2) | IRGANOX 1010 | 0.30 | 0.20 | 0.20 | 0.10 |
| | Antioxidant (C-3) | THANOX 330 | | | | |
| | Antioxidant (C-4) | IRGANOX 1098 | | | | |
| Evaluation of physical property | Evaluation result of mold releasability | | ○ | ○ | ○ | ⊚ |
| | Evaluation result of fuel oil resistance | | 2 | 1 | 1 | 1 |
| | Retention thermal stability (unit: min) | | 72 | 72 | 72 | 60 |

| | | | Example 13 | Example 14 | Example 15 | Example 16 |
|---|---|---|---|---|---|---|
| Formulation amount (parts by mass) | Polyacetal resin (A) | | 100 | 100 | 100 | 100 |
| | Mold release agent (B-1) | Hi-WAX 220MP (PE wax) | 0.10 | 0.15 | 0.10 | 0.10 |
| | Mold release agent (B-2) | Hi-WAX 800P (PE wax) | | | | |
| | Mold release agent (B-3) | Lubron L5 (Teflon wax) | | | | |
| | Mold release agent (B-4) | Pentaerythritol tetrastearate (PETS) | | | | |

TABLE 2-continued

|  |  |  |  |  |  |  |
|---|---|---|---|---|---|---|
|  | Mold release agent (B-5) | Calcium stearate (StCa) |  |  |  |  |
|  | Antioxidant (C-1) | IRGANOX 245 |  |  |  |  |
|  | Antioxidant (C-2) | IRGANOX 1010 | 0.05 |  |  |  |
|  | Antioxidant (C-3) | THANOX 330 |  | 0.10 | 0.05 |  |
|  | Antioxidant (C-4) | IRGANOX 1098 |  |  |  | 0.05 |
| Evaluation of | Evaluation result of mold releasability |  | ◎ | ○ | ◎ | ◎ |
| physical | Evaluation result of fuel oil resistance |  | 1 | 1 | 1 | 2 |
| property | Retention thermal stability (unit: min) |  | 60 | 72 | 72 | 48 |

TABLE 3

|  |  |  | Comparative example 1 | Comparative example 2 | Comparative example 3 | Comparative example 4 |
|---|---|---|---|---|---|---|
| Formulation | Polyacetal resin (A) |  | 100 | 100 | 100 | 100 |
| amount | Mold release agent (B-1) | Hi-WAX 220MP (PE wax) |  |  |  | 2.0 |
| (parts by | Mold release agent (B-2) | Hi-WAX 800P (PE wax) |  |  |  |  |
| mass) | Mold release agent (B-3) | Lubron L5 (Teflon wax) |  |  |  |  |
|  | Mold release agent (B-4) | Pentaerythritol tetrastearate (PETS) |  | 0.15 |  |  |
|  | Mold release agent (B-5) | Calcium stearate (StCa) |  |  | 0.15 |  |
|  | Antioxidant (C-1) | IRGANOX 245 | 0.30 | 0.30 | 0.30 | 0.30 |
|  | Antioxidant (C-2) | IRGANOX 1010 |  |  |  |  |
|  | Antioxidant (C-3) | THANOX 330 |  |  |  |  |
|  | Antioxidant (C-4) | IRGANOX 1098 |  |  |  |  |
| Evaluation of | Evaluation result of mold releasability |  | X | ○ | ○ | ◎ |
| physical | Evaluation result of fuel oil resistance |  | 1 | 5 | 5 | 5 |
| property | Retention thermal stability (unit: min) |  | 72 | 36 | 12 | 48 |

From Examples 1 to 16 and Comparative examples 1 to 4, it can be understood that the polyacetal resin compositions comprising (A) the polyacetal resin and the polyolefin-based wax and/or the polytetrafluoroethylene-based wax as (B) the mold release agent, and the content of (B) the mold release agent in the polyacetal resin composition being 0.01 part by mass or more and 1.0 part by mass or less based on 100 parts by mass of (A) the polyacetal resin are excellent in mold releasability, fuel oil resistance and thermal stability. Comparative example 1 which is an example of a polyacetal resin composition to which no (B) mold release agent is added, showed good fuel oil resistance and thermal stability, but mold releasability was not good since no (B) mold release agent was added. On the other hand, it can be understood that the polyacetal resin compositions of Comparative example 2 in which pentaerythritol tetrastearate which is a fatty acid ester is used as the mold release agent, and Comparative example 3 in which calcium stearate which is a fatty acid metal salt is used as the mold release agent showed good mold releasability but fuel oil resistance and thermal stability are not good. In addition, it can be understood that Comparative example 4 which is an example in which (B) the mold release agent is used with an excessive amount, is excellent in mold releasability but fuel oil resistance is not good even when (C) the antioxidant is used in combination.

Examples 9 to 15 are examples in which pentaerythritol-tetrakis[3-(3,5-di-tert-butyl-4-hydroxyphenyl)propionate] and/or 1,3,5-trimethyl-2,4,6-tris(3,5-di-tert-butyl-4-hydroxybenzyl)benzene is/are used as (C) the antioxidant, and it can be understood that these are more excellent in mold releasability, fuel oil resistance and thermal stability.

Examples 12, 13 and 15 are examples in which the content of (B) the mold release agent in the polyacetal resin composition is 0.08 part by mass or more and 0.12 part by mass or less based on 100 parts by mass of (A) the polyacetal resin, and the content of (C) the antioxidant is 0.03 part by mass or more and 0.15 part by mass or less based on 100 parts by mass of (A) the polyacetal resin, and it can be understood that these are particularly excellent in releasability, fuel oil resistance and thermal stability.

From the above, it can be understood that the polyacetal resin composition comprising (A) a polyacetal resin and (B) a mold release agent, (B) the mold release agent is a polyolefin-based wax and/or a polytetrafluoroethylene-based wax, and the content of (B) the mold release agent in the polyacetal resin composition is 0.01 part by mass or more and 1.0 part by mass or less based on 100 parts by mass of (A) the polyacetal resin is excellent in thermal stability, little elution of components of the resin composition upon brought into contact with fuel, and good releasability from a mold at the time of molding, and is excellent in the points of thermal stability, fuel oil resistance and mold releasability.

The invention claimed is:

1. A polyacetal resin composition which comprises (A) a polyacetal resin, (B) a mold release agent, and (C) an antioxidant, wherein (B) the mold release agent is a polyolefin-based wax and/or a polytetrafluoroethylene-based wax, a content of (B) the mold release agent in the polyacetal resin composition is 0.01 part by mass or more and 1.0 part by mass or less based on 100 parts by mass of (A) the polyacetal resin, and (C) the antioxidant is selected from the group consisting of pentaerythritol-tetrakis[3-(3,5-di-tert-butyl-4-hydroxyphenyl)propionate], 1,3,5-trimethyl-2,4,6-tris(3,5-di-tert-butyl-4-hydroxybenzyl)benzene, and mixtures thereof.

2. The polyacetal resin composition according to claim 1, wherein (B) the mold release agent is a polyethylene-based wax and/or a polytetrafluoroethylene-based wax.

3. The polyacetal resin composition according to claim 2, wherein (B) the mold release agent is a polyethylene-based wax, and a viscosity average molecular weight of the polyethylene-based wax is 500 to 15,000.

4. The polyacetal resin composition according to claim 1, wherein a content of (B) the mold release agent in the polyacetal resin composition is 0.04 part by mass or more and 0.15 part by mass or less based on 100 parts by mass of (A) the polyacetal resin.

5. The polyacetal resin composition according to claim 1, wherein the (C) antioxidant is present in a content of 0.01 part by mass or more and 3.0 parts by mass or less based on 100 parts by mass of (A) the polyacetal resin.

6. The polyacetal resin composition according to claim 5, wherein the content of (C) the antioxidant in the polyacetal resin composition is 0.03 part by mass or more and 0.15 part by mass or less based on 100 parts by mass of (A) the polyacetal resin.

7. A molded product obtained by molding the polyacetal resin composition according to any one of claims 1 to 5 or 6.

8. The polyacetal resin composition according to any one of claims 1 to 5 or 6 which is used for a part brought into contact with fuel.

9. The molded product according to claim 7, which is a part brought into contact with fuel.

10. The molded product according to claim 9, wherein the fuel is one kind or two or more kinds selected from the group consisting of gasoline fuel, gasohol fuel, diesel fuel and biofuel.

\* \* \* \* \*